United States Patent [19]

Nieuwenhuize et al.

[11] Patent Number: 5,063,106

[45] Date of Patent: Nov. 5, 1991

[54] THERMOPLASTIC PLASTICIZER-RESISTANT FILM AND PRESSURE-SENSITIVE ADHESIVE FILM COMPRISING THE PLASTICIZER-RESISTANT FILM

[75] Inventors: O. V. Nieuwenhuize, Leiden; F. de Grunt, Zoetermeer; S. de Vissser, Boskoop; R. Vos, Alphen a/d Rijn, all of Netherlands

[73] Assignee: Avery Dennison Corporation, Pasadena, Calif.

[21] Appl. No.: 313,170

[22] Filed: Feb. 21, 1989

[30] Foreign Application Priority Data

Feb. 19, 1988 [NL] Netherlands ............... 8800428

[51] Int. Cl.$^5$ ............... B32B 27/32; B32B 7/12
[52] U.S. Cl. ............... 428/343; 428/355; 428/518
[58] Field of Search ............... 428/343, 355, 518

[56] References Cited

U.S. PATENT DOCUMENTS

| | | | |
|---|---|---|---|
| 4,343,856 | 8/1982 | Goswami et al. | 428/352 X |
| 4,496,628 | 1/1985 | Deatcher et al. | 428/343 X |
| 4,599,260 | 7/1986 | Truskolaski et al. | 428/352 X |
| 4,724,186 | 2/1988 | Kelch | 428/353 X |

FOREIGN PATENT DOCUMENTS 103407 11/1983 European Pat. Off. .

Primary Examiner—George F. Lesmes
Assistant Examiner—D. R. Zirker
Attorney, Agent, or Firm—Christie, Parker & Hale

[57] ABSTRACT

There is provided a plasticizer-resistant film, and such film is combined with a plasticizer-resistant, pressure-sensitive adhesive layer. The film is a blend of certain polyvinyl chlorides and chlorinated polyethylenes. The adhesive includes a polyacrylate.

12 Claims, No Drawings

THERMOPLASTIC PLASTICIZER-RESISTANT FILM AND PRESSURE-SENSITIVE ADHESIVE FILM COMPRISING THE PLASTICIZER-RESISTANT FILM

FIELD OF THE INVENTION

The invention relates to a thermoplastic plasticizer-resistant film. The film will not change its dimensions or turn sticky when plasticizer molecules penetrate the film. In particular, the invention relates to a pressure-sensitive film adapted for adherence to a vinyl substrate plasticized with monomeric plasticizer without change of dimension.

BACKGROUND OF THE INVENTION

Vinyl substrates plasticized with monomeric plasticizers have found extensive use for interior surfaces such as wall coverings and exterior surfaces such as vinyl coated canvas for trucks. These vinyl substrates contain as much as 25–75 parts of monomeric plasticizer, of the vinyl resin. Letters, figures or drawings are applied to said vinyl substrates by hand painting or by printing with screen printing inks. For this object also a pressure-sensitive vinyl film optionally printed with letters, etc., can be used. In the latter case, vinyl film wrinkles and turns sticky, and the adhesive layer loses adhesion.

These problems are substantially attributable to the migration of plasticizers from the substrate into the film. European Patent Specification 103.407, incorporated herein by reference, discloses a pressure-sensitive film adapted for adherence to vinyl substrate plasticized with monomeric plasticizer. This film comprises a first layer of polyvinyl chloride (PVC), a second layer of a plasticizer-resistant, pressure-sensitive adhesive and a third layer between said first and second layers serving as a barrier for migration of the plasticizer from the vinyl substrate. This film meets the following demands. It is capable of maintaining adhesion and a wrinkle-free surface when adhered to a plasticizer substrate, and is receptive to conventional screen printing inks as commonly used for printing PVC films.

SUMMARY OF THE INVENTION

This invention relates to a thermoplastic plasticizer-resistant film comprising a blend of polyvinyl chloride and chlorinated polyethylene for use with plasticizer-resistant, pressure-sensitive adhesives.

In particular, this invention relates to a pressure-sensitive adhesive film combination consisting of only two layers, which film meets the three-layer product performance of the '407 patent publication. This pressure-sensitive film comprises a first layer consisting of a blend of polyvinyl chloride and chlorinated polyethylene and a second layer consisting of a plasticizer-resistant pressure-sensitive adhesive.

The pressure-sensitive film, according to the invention, meets the three previously mentioned product demands. First, the blend of polyvinyl chloride and chlorinated polyethylene is receptive to conventional screen printing inks as commonly used for printing PVC films.

Owing to the lack of a barrier layer, monomeric plasticizer will diffuse from the vinyl substrate into the film. However, the plasticizer concentration will reach an equilibrium, and this concentration of plasticizer does not lead to a sticky or wrinkling film or adversely impact the pressure-sensitive adhesive layer. The pressure-sensitive adhesive used with the film is typically acrylic based and drop in adhesive strength due to entry of plasticizer is within acceptable limits.

DETAILED DESCRIPTION

Hereinbelow is a more detailed description of both the thermoplastic plasticizer-resistant film and the layer of the pressure-sensitive adhesive according to the invention.

A suitable weight ratio of polyvinyl chloride:chlorinated polyethylene is 10:90 to 90:10, preferably 35:65 to 65:35. The ratio of polyvinyl chloride:chlorinated polyethylene which gives the best film properties, depends on other parameters, such as the K value of the polyvinyl chloride, the melting viscosity of the chlorinated polyethylene and the processing conditions of the polymer blend. Thus, using polyvinyl chloride having a high K-value[a] relatively more chlorinated polyethylene is necessary to get good film properties.

[a] A measure of molecular weight based on viscosity "Encyclopedia of Polymer Science and Technology," Vol. 14, John Wiley & Sons (1971).

The already mentioned K-value or inherent viscosity of the polyvinyl chloride is a measure of the average molecular weight. This K-value can amount to 45–80, preferably to 50–65. By applying polyvinyl chloride having K-values higher than 80 it costs much power to prepare a blend having the required distribution of polyvinyl chloride and chlorinated polyethylene. In addition in that case a somewhat more rigid film is produced.

The polyvinyl chloride can be prepared in any conventional manner, that is, by suspension-, mass- or emulsion polymerization. Usually polyvinyl chloride produced by suspension polymerization is used.

The chlorinated polyethylene that is applied, can be produced according to known methods by chlorination of polyethylene. Suitable chlorinated polyethylenes have a chloride content of 30–45% by weight and preferably about 42% by weight, and a melt viscosity of 600–3,000 Pa.s.

The blend of chlorinated polyethylene and polyvinyl chloride usually comprises furthermore UV- and/or heat-stabilizers, antioxidant, pigment or other usual additives. Plasticizers are, in general, not present or substantially not present because of the plasticizing effect of the chlorinated polyethylene.

Ethylene/vinyl acetate copolymers in an amount of up to 10% by weight may be added to the polymer blend without affecting the properties of the film. The blend of chlorinated polyethylene and polyvinyl chloride may be prepared with any conventional blending apparatus. Therefore, the two polymers in the appropriate amount in the form of, for example, powders together with further usual additives are added to the blending apparatus. The blend is thoroughly mixed until a homogeneous melt is obtained, preventing decomposition of primarily the polyvinyl chloride. Subsequently, a film is manufactured from the homogeneous melt by any conventional manner including casting, extruding and calendering.

The thickness of said film may be 0.01–1.15 mm and preferably 0.60–0.10 mm.

The adhesive used in the pressure-sensitive film according to the invention, must be pressure-sensitive (self-adhesive) and plasticizer-resistant; the latter means that the adhesive should have an adhesion level which is sufficiently high independent of the plasticizer concentration.

Adhesives described in the European Patent Specification 104 407, incorporated herein by reference, discloses adhesives functional for this purpose. Generally, adhesives which have proved to function, comprise polymers of a combination of the following monomers; acrylic acid, methacrylic acid, acrylamide, methacrylamide (preferably present in amounts from 1.0% to about 10% by weight, alkyl acrylates, alkyl methacrylates containing at least 4 carbon atoms (preferably present in amounts of about 35% to 85% by weight), and other unsaturated monomers, like N-vinyl pyrrolidone (5 to 15% by weight), methyl acrylate (15 to 50% by weight) and vinyl acetate (20.0-50.0% by weight). Fumaric acid and/or mono-and diesters of unsaturated dicarboxylic acids like dibutyl fumarate may also be present.

A specific adhesive composition found suitable in the practice of this invention is a terpolymer made from 52.2 parts n-butylacrylate, 37.5 parts methyl acrylate, and 10 parts of acrylic acid. For economy this adhesive may be prepared at a low inherent viscosity and cross-linking agent. Another adhesive found suitable in the practice of this invention is a linear terpolymer consisting of 56.0 parts of isooctylacrylate, 40.1 parts of vinyl acetate and 4.0 parts of acrylic acid. Yet another adhesive is a terpolymer prepared from 85.0 parts of n-butylacrylate or methylbutylacrylate, 10.0 parts of N-vinyl pyrrolidone and 5.0 parts of acrylic acid.

The best results are obtained when such a polyacrylate is blended with a certain amount, preferably 10-35%, of a phthalic acid ester of hydroabietyl alcohol and with a certain amount, preferably 0.5-5%, of a dialkyl phthalate.

The polyacrylate and the additional blends are present in the form of a 25-35% solution in suitable solvents, like isopropanol, hexane, toluene, ethyl acetate, etc. The required cross-linking is effected with conventional methods such as irradiation by electron beams or addition of metal organic compounds such as aluminum acetyl acetonate of the solution.

The adhesive is in general present in an amount of 20-70 gr/m² film. The adhesive can be applied to the film by any conventional coating method to obtain a regular distribution of the adhesive upon the surface.

TEST METHODS

In the following Example, the pressure-sensitive films manufactured according to the invention are subjected to the following tests:

1. 90° Peel Adhesion

The adhesion is the force needed to peel a pressure-sensitive film applied to a substrate. Test specimen having a length of 150 mm and a width of 25 mm are used, and the adhesion is determined in N/25 mm. Test specimen are peeled under 90° at a rate of 300 mm/min. using a tester at a temperature 23°±2° C. The test is carried out 24 hours after applying to the substrate, in which time the adhesion has been sufficiently built up. In addition the test is carried out after three weeks (accelerated) aging of adhered film and substrate at 70° C. in a hot air oven. It is assumed that three weeks at 70° C. is highly sufficient to produce an equilibrium situation of the plasticizer distribution in substrate, adhesive and PVC[a]/CPE[b] layer, as will be reached in practice after a period of time.
[a]Polyvinyl chloride
[b]Chlorinated polyethylene 2. Appearance Appearance of adhered films is evaluated after staying in a hot air oven at 70° C. for one, two, and three weeks; reference is an unaged film. Evaluation criteria are wrinkling, shrinkage and stickiness of the PVC/CPE layer. All the films mentioned in the Example were evaluated as good after three weeks at 70° C.

3. Flexibility

As there is no standard test for evaluation of the flexibility, the flexibility is provisionally evaluated by manual movement. It appeared that films wherein the amount of chlorinated polyethylene was somewhat higher and the K-value of the polyvinyl chloride was somewhat lower are most satisfactory.

EXAMPLE

A number of representative pressure-sensitive films according to the invention has been manufactured. The first layer consisting of a blend of chlorinated polyethylene and polyvinyl chloride has a thickness of 100 m. The types of polyvinyl chloride (prepared by suspension-, mass- or emulsion- polymerization, s, m and e respectively), the K-value of the PVC, the chloride content of the CPE and the weight ratio of PVC/CPE are mentioned in the attached table. The PVC/CPE blends comprise per 100 parts by weight a stabilization package consisting of 1.5 part by weight of heat stabilizer, 1 part by weight of UV-stabilizer, 0.5 part by weight of antioxidant, 1 part by weight of processing aid (methacrylate) and 2.5 parts by weight of fatty acid esters.

The PVC/CPE-layer is provided in a conventional way with such a layer of adhesive that the weight of the adhesive regularly distributed upon the surface is 40 g/m². The adhesive composition is 72% by weight of polyacrylate polymer derived from the monomers 2-ethylhexylphtalate, vinylacetate and acrylic acid, 24% by weight of phthalic acid ester of hydro-abietyl alcohol, 3.5% by weight of dialkyl phthalate and 0.5% by weight of aluminum acetyl acetonate.

The resulting pressure-sensitive films are laminated on vinyl substrates. The basis of the substrates (tarpaulins) used in the tests is a woven canvas structure, to which and within which plasticized PVC is applied. The tarpaulins may optionally be provided with coatings. Said coatings (acrylate) affect indeed the adherence level which does not have very large consequences for the initial adherence, but they do affect distinctly the adherence as a function of time, as said coatings somewhat provide diffusion barriers which means that the equilibrium situation is reached less rapidly. This is also shown by plasticizer concentration determinations at certain times of accelerated aging in identical film samples adhered to coated and uncoated plasticized PVC substrates. This means that pressure-sensitive films adapted for application on uncoated plasticized PVC substrates are certainly adapted for application on coated plasticized PVC substrates.

The concentration of plasticizer in the PVC of the substrate is 30-40% by weight. All the used plasticizers are phthalic acid esters of alkanols having at least 8 carbon atoms. Frequently applied plasticizers are dioctyl phthalate and didecyl phthalate, the first mentioned having the highest diffusion rate in otherwise identical conditions.

The substrate used for aging comprises a blend of substantially these two plasticizers.

The adherence level of the pressure-sensitive film with the substrate after lamination and 24 hours at room temperature to build up said adherence is satisfying for all these films and it varies between 11 and 17 N/25 mm. The constructions comprising substrate, adhesive layer and PVC/CPE layer as indicated in the table are subjected to accelerated aging for three weeks (500 hours) at 70° C. After said aging, the adherence of the pressure-sensitive films with the substrates is determined.

TABLE

| PVC type | K-value | CPE (% by weight) | PVC/CPE (% by weight) | 90° Peel Adhesion (after aging) | |
|---|---|---|---|---|---|
| | | | | uncoated substrate (N/25 mm) | coated substrate (N/25 mm) |
| s | 50 | 42 | 40/60 | 21.9 | 10.4 |
| s | 50 | 36 | 20/80 | 12.5 | 10.0 |
| s[1] | 50 | 42 | 45/55 | 10.1 | 9.8 |
| m | 58 | 36 | 40/60 | 8.0 | 7.0 |
| s | 58 | 42 | 40/60 | 9.0 | 8.4 |
| e | 60 | 42 | 40/60 | 8.1 | 9.1 |
| m | 60 | 36 | 40/60 | 12.6 | 7.4 |
| m | 60 | 42 | 20/80 | 8.7 | 8.4 |
| s | 65 | 36 | 60/40 | 14.2 | 8.5 |
| s | 70 | 36 | 80/20 | 7.9 | 7.8 |
| s | 80 | 36 | 20/80 | 15.7 | 11.1 |
| s | 80 | 42 | 20/80 | 11.9 | 9.3 |

[1]addition of 25% parts by weight of titanium dioxyde (rutile) per 100 parts by weight of PVC/CPE.

What is claimed is:

1. A plasticizer-resistant film comprised of a layer formed of a blend of polyvinyl chloride and chlorinated polyethylene in respective weight rations of 10:90 to 65:35 in which the polyvinyl chloride has a K-value of 45 to 80 and the chloride content of the chlorinated polyethylene is from 30 to 40% by weight, said film being receptive to retaining diffused plasticizer from a plasticized substrate without becoming sticky and in contact with said layer, a plasticizer-resistant, pressure-sensitive adhesive which retains adhesion in the presence of a plasticizer, said adhesive comprising a polymer containing an alkyl acrylate or alkyl methacrylate or mixtures thereof.

2. A pressure-sensitive adhesive film as claimed in claim 6 in which the weight ratio of polyvinyl chloride to chlorinated polyethylene is from 35:65 to 65:35.

3. A pressure-sensitive adhesive film as claimed in claim 6 in which the polyvinyl chloride polymer has a K-value of 50 to 65.

4. A pressure-sensitive adhesive film as claimed in claim 6 in which the chlorinated polyethylene has a chlorine content of 42% by weight and a melt viscosity of 600 to 3,000 PaS.

5. A pressure-sensitive adhesive film as claimed in claim 6 in which there is present in the film an ethylene vinyl acetate polymer present in an amount up to 10% by weight of the polymers.

6. A pressure-sensitive adhesive film as claimed in claim 6 in which the pressure-sensitive adhesive is applied at a coat weight of preferably 30 to 50 g/m$^2$.

7. A pressure-sensitive adhesive as claimed in claim 6 in which the pressure-sensitive adhesive comprises a polyacrylate.

8. A pressure-sensitive adhesive film as claimed in claim 6 in which the adhesive includes a dialkyl phthalate and from 10 to 35% by weight of a phthalic acid ester of hydroabretyl alcohol.

9. A pressure-sensitive adhesive film as claimed in claim 15 in which the dialkyl phthalate is present in an amount of from 0.5 to 5% by weight of the pressure-sensitive adhesive.

10. A pressure-sensitive adhesive film as claimed in claim 12 in which the adhesive includes a dialkyl phthalate and from 10 to 35% by weight of a phthalic acid ester of hydroabretyl alcohol.

11. A pressure-sensitive adhesive film as claimed in claim 15 in which the dialkyl phthalate is present in an amount of from 0.5 to 5% by weight of the pressure-sensitive adhesive.

12. A pressure-sensitive adhesive film as claimed in claim 14 in which the pressure-sensitive adhesive contains 72% by weight polyacrylate, 24% by weight of phthalic acid ester of hydroabretyl alcohol, 3.5% by weight dialkyl phthalate and 9.5% by weight aluminum acetyl acetonate.

* * * * *

UNITED STATES PATENT AND TRADEMARK OFFICE
CERTIFICATE OF CORRECTION

PATENT NO. : 5,063,106

DATED : November 5, 1991

INVENTOR(S) : O.V. Nieuwenhuize; F. de Grunt; S. de Vissser; R. Vos

It is certified that error appears in the above-identified patent and that said Letters Patent is hereby corrected as shown below:

Column 1, line 31, change "103.407" to -- 103 407 --.

Column 3, line 4, change "104 407" to -- 103 407 --.

Column 6, line 2, change "claim 6" to -- claim 1 --.
Column 6, line 5, change "claim 6" to -- claim 1 --.
Column 6, line 8, change "claim 6" to -- claim 1 --.
Column 6, line 12, change "claim 6" to -- claim 1 --.
Column 6, line 16, change "claim 6" to -- claim 1 --.
Column 6, line 18, change "claim 6" to -- claim 1 --.
Column 6, line 22, change "claim 6" to -- claim 1 --.
Column 6, line 24, change "hydroabretyl" to -- hydroabietyl --.
Column 6, line 26, change "claim 15" to -- claim 8 --.
Column 6, line 30, change "claim 12" to -- claim 7 --.
Column 6, line 32, change "hydroabretyl" to -- hydroabietyl --.

UNITED STATES PATENT AND TRADEMARK OFFICE
CERTIFICATE OF CORRECTION

PATENT NO. : 5,063,106

DATED : November 5, 1991

INVENTOR(S) : O.V. Nieuwenhuize; F. de Grunt; S. de Vissser; R. Vos

It is certified that error appears in the above-identified patent and that said Letters Patent is hereby corrected as shown below:

```
Column 6, line 34, change "claim 15" to -- claim 10 --.
Column 6, line 38, change "claim 14" to -- claim 9 --.
Column 6, line 40, change "hydroabretyl" to
        -- hydroabietyl --.
```

Signed and Sealed this

Thirtieth Day of November, 1993

Attest:

BRUCE LEHMAN

Attesting Officer

Commissioner of Patents and Trademarks